(12) United States Patent
Tokita et al.

(10) Patent No.: US 7,552,872 B2
(45) Date of Patent: Jun. 30, 2009

(54) READER/WRITER, OPTICAL TRANSCEIVER MODULE, AND CABLE SYSTEM

(75) Inventors: Shigeru Tokita, Yokohama (JP); Hiroo Matsue, Yokohama (JP); Antony Cleitus, Cork (IE); Tomonao Kikuchi, Fujisawa (JP)

(73) Assignee: Opnext Japan, Inc., Yokohama (JP)

( * ) Notice: Subject to any disclaimer, the term of this patent is extended or adjusted under 35 U.S.C. 154(b) by 178 days.

(21) Appl. No.: 11/671,055

(22) Filed: Feb. 5, 2007

(65) Prior Publication Data

US 2007/0296553 A1    Dec. 27, 2007

(30) Foreign Application Priority Data

Jun. 21, 2006   (JP)   ................. 2006-170886

(51) Int. Cl.
| | |
|---|---|
| G06K 7/00 | (2006.01) |
| G06K 7/08 | (2006.01) |
| G06K 19/06 | (2006.01) |
| H04Q 5/22 | (2006.01) |
| G08B 13/14 | (2006.01) |

(52) U.S. Cl. .................. 235/440; 235/375; 235/441; 235/451; 235/486; 235/492; 340/10.51; 340/572.1

(58) Field of Classification Search .................. 235/375, 235/440, 441, 486, 492; 340/10.51, 572.1
See application file for complete search history.

(56) References Cited

U.S. PATENT DOCUMENTS

| | | | | |
|---|---|---|---|---|
| 6,415,978 | B1 * | 7/2002 | McAllister | ............. 235/462.01 |
| 7,117,374 | B2 * | 10/2006 | Hill et al. | ..................... 713/193 |
| 7,295,108 | B2 * | 11/2007 | Corrado et al. | ........ 340/539.22 |
| 2007/0035381 | A1 * | 2/2007 | Davis | ........................ 340/10.1 |
| 2007/0285239 | A1 * | 12/2007 | Easton et al. | ............. 340/572.1 |

FOREIGN PATENT DOCUMENTS

JP        2005-216698        8/2005

* cited by examiner

Primary Examiner—Thien M. Le
Assistant Examiner—Tuyen K Vo
(74) Attorney, Agent, or Firm—Antonelli, Terry, Stout & Kraus, LLP.

(57) ABSTRACT

A reader/writer is provided which is capable of speedily recognizing a correspondence between one end and the other end of a fiber-optic cable when a plurality of fiber-optic cables is laid. The reader/writer according to the present invention reads, on receiving through the fiber-optic cable a signal that is an instruction to read data from a RF tag mounted to an end of the fiber-optic cable, data from the RF tag through radio communication, and transmits the read data through the fiber-optic cable. Also, on receiving through the fiber-optic cable a signal that is an instruction to write data into the RF tag and a signal indicating the write data, the reader/writer writes the write instruction and the write data into the RF tag through radio communication.

10 Claims, 6 Drawing Sheets

| ITEM | DATA |
|---|---|
| LENGTH | 300m |
| TYPE | SMF |
| MANUFACTURER'S NAME | XXXXX |
| MANUFACTURING NUMBER | 12345 |
| USER SETTING INFORMATION 1 | aaaaa |
| USER SETTING INFORMATION 2 | bbbbb |
| ⋮ | ⋮ |

CONNECTOR 21

CABLE SYSTEM 30

OPTICAL TRANSMISSION DEVICE 40

OPTICAL TRANSCEIVER MODULE 50

OPTICAL TRANSMITTER 51

OPTICAL RECEIVER 53

CABLE SYSTEM 60

READER/WRITER, OPTICAL TRANSCEIVER MODULE, AND CABLE SYSTEM

This application relates to and claims priority from Japanese Patent Application No. 2006-170886, filed on Jun. 21, 2006, the entire disclosure of which is incorporated herein by reference.

BACKGROUND OF THE INVENTION

The present invention relates to a reader/writer (reading and writing device) for a noncontact RF (Radio Frequency) tag provided to a fiber-optic cable or to an electrical cable.

Japanese Patent Laid-open Publication No. 2005-216698 (hereinafter, referred to as Patent Document 1) discloses a technique in which an RF tag is provided to a plug provided at an end of a cable and also to an adaptor which connects the plug, and unique information is recorded on each RF tag. According to the technique of Patent Document 1, there is created a table which shows a correspondence between a plug and an adapter to be connected to each other based on the information written into each RF tag. During an actual connecting operation, information recorded in a plug and information recorded in an adapter are respectively read through a reader/writer, and the table thus created is referred to for the information so as to appropriately connect the plug and the adapter, to thereby conduct the connecting work speedily.

SUMMARY OF THE INVENTION

The above-mentioned technique disclosed in Patent Document 1 is based on an assumption that each of the cables is laid, after an RF tag, on which information corresponding to each of the cables is recorded in advance, is provided on both ends of the cable. In this case, it is true that the correspondence between both ends of the cable can be recognized based on the information recorded on each RF tag. However, in many cases, power lines and communication cables are laid beforehand in the construction stage of a building, and connected afterwards when the building is completed and equipment to be connected is installed in the building. Therefore, unless the cables are provided with RF tags, it is necessary to conduct work to investigate a correspondence between one end and the other end of each of the cables.

Also, it is only recently that the RF tag technology has been established. Cables that have been laid before the establishment of the RF tag technology are not provided with RF tags. Therefore, it is necessary to confirm one by one the correspondence between one end and the other end of each of the cables, which may lead to a case where it takes a long time to connect those cables.

The present invention has been made in view of the above-mentioned circumstances, and therefore, it is an object of the invention to provide a technique capable of speedily recognizing a correspondence between one end and the other end of a cable when a plurality of cables is laid.

In order to attain the above-mentioned object, the present invention provides a device which is capable of, in a case where a signal that is an instruction to read data in an RF tag provided at an end of a cable is received through the cable, reading the data from the RF tag and transmitting the read data through the cable.

According to a first aspect of the present invention, there is provided a reader/writer, which writes data into an RF tag mounted to an end of a fiber-optic cable and reads data from the RF tag, through radio communication, the reader/writer including: an optical receiver which converts an optical signal received through the fiber-optic cable into an electric signal; an optical transmitter which converts an electric signal into an optical signal and transmits the optical signal to the fiber-optic cable; a radio communication unit which performs radio communication with the RF tag; and an RF tag control unit which reads, on receiving through the optical receiver a signal that is an instruction to read data, data from the RF tag through the radio communication unit and transmits the read data to the fiber-optic cable through the optical transmitter, and writes, on receiving through the optical receiver a signal that is an instruction to write data and a signal indicating the write data, the write data thus received into the RF tag through the radio communication unit.

Also, according to a second aspect of the present invention, there is provided an optical transceiver module which includes an optical receiver which converts an optical signal received through a fiber-optic cable into an electric signal; an optical transmitter which converts an electric signal into an optical signal and transmits the optical signal to the fiber-optic cable; a radio communication unit which performs radio communication with an RF tag mounted to an end of the fiber-optic cable; and an RF tag control unit which reads, on receiving through the optical receiver a signal that is an instruction to read data, data from the RF tag through the radio communication unit and transmits the read data to the fiber-optic cable through the optical transmitter, and writes, on receiving through the optical receiver a signal that is an instruction to write data and a signal indicating the write data, the write data thus received into the RF tag through the radio communication unit.

Further, according to a third aspect of the present invention, there is provided a reader/writer which writes data into an RF tag, the RF tag being mounted to an end of a cable which transmits and receives an electric signal, and reads data from the RF tag, through radio communication, the reader/writer including: a receiver which receives an electric signal received through the cable; a transmitter which transmits an electric signal to the cable; a radio communication unit which performs radio communication with the RF tag; and an RF tag control unit which reads, on receiving through the receiver a signal that is an instruction to read data, data from the RF tag through the radio communication unit and transmits the read data to the cable through the transmitter, and writes, on receiving through the receiver a signal that is an instruction to write data and a signal indicating the write data, the write data thus received into the RF tag through the radio communication unit.

According to the present invention, it is possible to speedily recognize the correspondence between one end and the other end of a cable when a plurality of cables is laid. Further, it is possible to write necessary data into an RF tag from one end of the cable through the cable even when the RF tag is provided to the other end of the cable, without moving all the way to the place where the other end of the cable is laid.

DESCRIPTION OF THE PREFERRED EMBODIMENTS

Hereinafter, a first embodiment according to the present invention is explained.

Figures 1, 2:
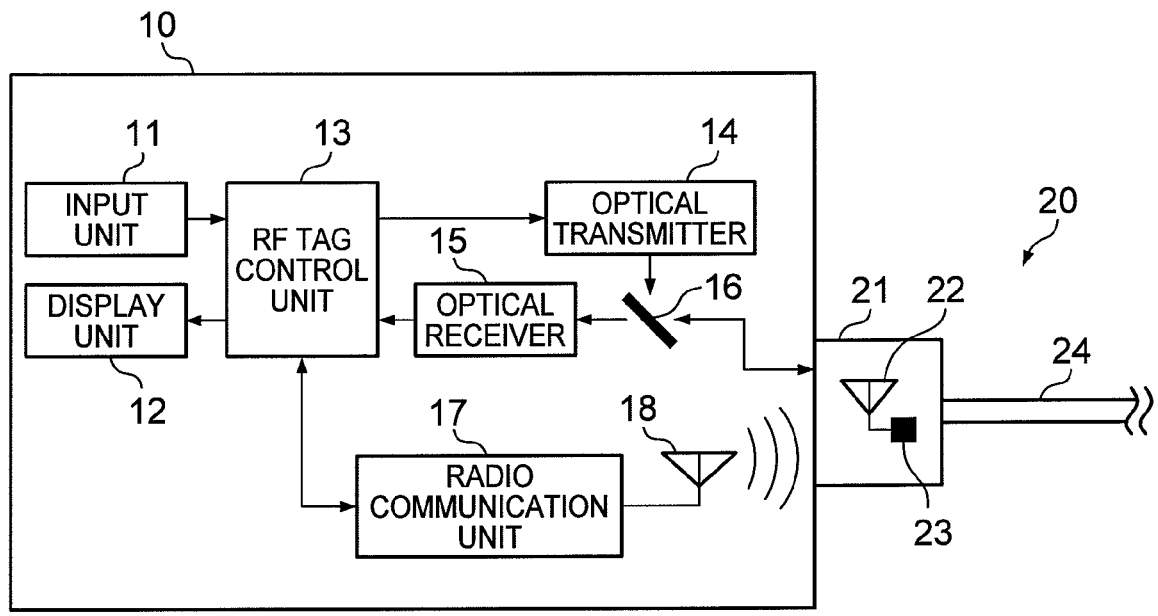
FIG. 1 is a block diagram illustrating a configuration of a reader/writer according to a first embodiment of the present invention.
FIG. 2 is a diagram illustrating a structure of data stored in a memory of an IC chip.

FIG. 1 is a block diagram illustrating a configuration of a reader/writer 10 according to the first embodiment of the present invention. The reader/writer 10 includes an input unit 11, a display unit 12, an RF tag control unit 13, an optical transmitter 14, an optical receiver 15, an optical splitter 16, a radio communication unit 17, and an antenna 18. The reader/writer 10 is used while being connected to a fiber-optic cable 20 which transmits an optical signal.

The fiber-optic cable 20 is provided with a connector 21 at both ends thereof. The connector 21 accommodates an antenna 22 and an IC chip 23. The IC chip 23 is driven by electric power generated by a radio wave received through the antenna 22. The IC chip 23 has a function of performing radio communication through the antenna 22 in compliance with the specifications of an RF tag (for example, ISO/IEC 18000-3) and a memory or the like which stores data externally obtained through radio communication. The antenna 22 and the IC chip 23 constitute an RF tag.

The input unit 11 is, for example, a keyboard, which accepts an operational input from a user and supplies the input to the RF tag control unit 13. The display unit 12 is, for example, a liquid crystal display (LCD), which displays data outputted from the RF tag control unit 13. Alternatively, as another example, the input unit 11 and the display unit 12 each may function as an interface with an input device such as a keyboard and a display device such as an LCD, respectively, the input device and the display device being provided outside of the reader/writer 10.

The optical splitter 16 is, for example, a translucent mirror, which sends an optical signal received through the fiber-optic cable 20, to the optical receiver 15. The optical splitter 16 also sends an optical signal transmitted from the optical transmitter 14, to the fiber-optic cable 20. The optical receiver 15 converts the optical signal received through the optical splitter 16 into an electric signal and supplies the electric signal to the RF tag control unit 13. The optical transmitter 14 converts the electric signal received from the RF tag control unit 13 into an optical signal, and transmits the optical signal obtained by the conversion to the fiber-optic cable 20 through the optical splitter 16.

The radio communication unit 17 communicates, in response to an instruction from the RF tag control unit 13, with the IC chip 23 by radio in compliance with the specification of the RF tag, through the antenna 18, to thereby execute a process of reading data stored in the memory of the IC chip 23 and providing the data to the RF tag control unit 13 and a process of writing data received from the RF tag control unit 13 into the memory of the IC chip 23.

When receiving an instruction from a user through the input unit 11 to read data from the RF tag, the RF tag control unit 13 instructs the radio communication unit 17 to read data stored in the memory of the IC chip 23. Then, the RF tag control unit 13 displays the data received from the radio communication unit 17 in response to the data read instruction, on the display unit 12. When receiving an instruction from a user through the input unit 11 to write data into the RF tag and the write data, the RF tag control unit 13 sends the data write instruction and the write data to the radio communication unit 17.

Further, when receiving an instruction through the optical receiver 15 to read data from the RF tag, the RF tag control unit 13 instructs the radio communication unit 17 to read data stored in the memory of the IC chip 23. Then, the RF tag control unit 13 sends the data received from the radio communication unit 17 in response to the data read instruction, to the optical transmitter 14. When receiving a signal instructing data write and a signal indicating the write data through the optical receiver 15, the RF tag control unit 13 sends the data write instruction and the write data to the radio communication unit 17.

FIG. 2 illustrates a structure of data stored in the memory of the IC chip 23. The memory of the IC chip 23 stores data 231 in association with each item 230. The memory of the IC chip 23 records, for example, identifying information and unique information of the fiber-optic cable 20 to which the IC chip 23 is mounted.

The present invention assumes a case of a fiber-optic cable laid in a building in advance and the fiber-optic cable does not have an RF tag mounted thereon. Accordingly, the connector 21, having the antenna 22 and the IC chip 23, is mounted on both ends of the fiber-optic cable 20, at a connection stage, and predetermined data is written into the memory of the IC chip 23 by using the reader/writer 10. Additionally, the connector 21, having the IC chip 23 into which the predetermined data has been written, and the antenna 22 may be provided on both ends of the fiber-optic cable 20.

According to another example, information regarding the fiber-optic cable 20 may be written into the memory of the IC chip 23 by the manufacturer of the fiber-optic cable 20 in the stage of shipment, or the like, of the fiber-optic cable 20. Even in this case, it is preferable that the memory of the IC chip 23 be provided with an area to which a user of the fiber-optic cable 20 can write additional data so that, when the user connects the fiber-optic cable 20, the user of the fiber-optic cable 20 can write information regarding the connection (such as location of connection, connecting state, or the number of insertions and removals) by using the reader/writer 10.

Figure 3:
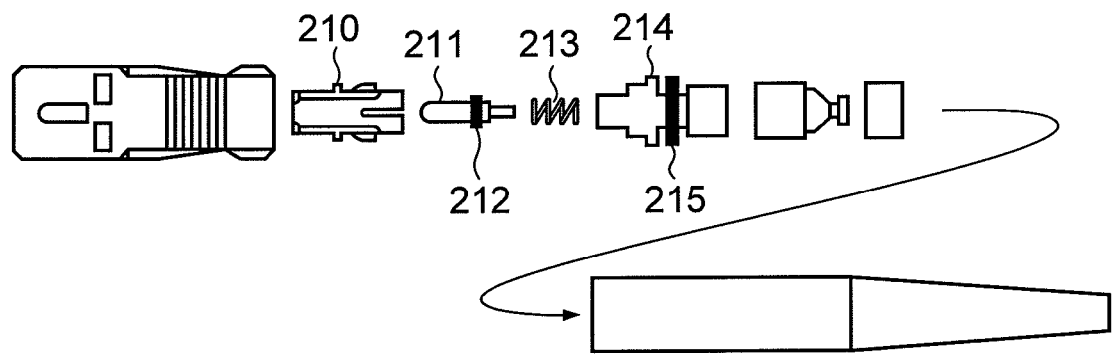
FIG. 3 is a diagram illustrating a detailed configuration of a connector of a fiber-optic cable.

FIG. 3 illustrates a detailed configuration of the connector 21 of the fiber-optic cable 20. The connector 21 includes a frame 210, a ferrule 211, a coil spring 213, and a stop ring 214. The coil spring 213 is made of a conductive material. The ferrule 211 is provided with a ferrule hold 212 made of a conductive material. The stop ring 214 is provided with a protrusion 215 made of a conductive material.

The ferrule 211 is inserted into the coil spring 213. The ferrule 211 into which the coil spring 213 is inserted is inserted into the stop ring 214 of a hollow cylindrical shape. Then, the stop ring 214 into which the ferrule 211 and the coil spring 213 are inserted is inserted into the frame 210 of a hollow cylindrical shape, thereby forming the connector 21. The coil spring 213 is used, when the fiber-optic cable 20 of single coupling (SC) type is connected to a receptor, to induce a thrusting force to urge the ferrule in the receptor and the ferrule in the fiber-optic cable 20 in a direction opposite from each other.

Figure 4:
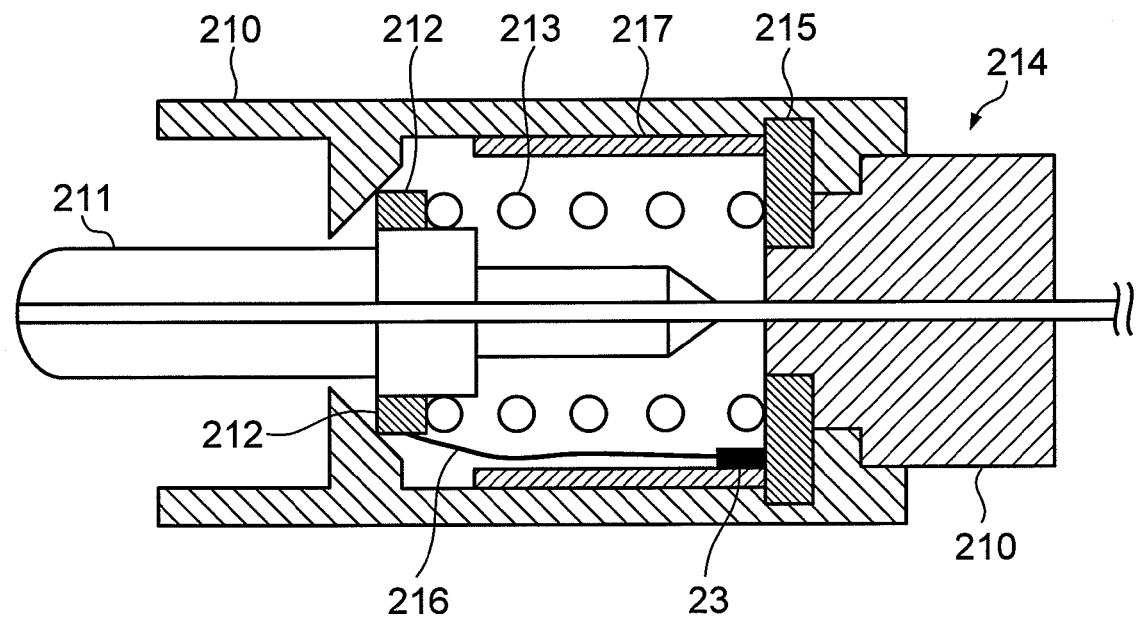
FIG. 4 is a cross-sectional view of the connector which is assembled from a frame, a ferrule, a coil spring, and a stop ring.

FIG. 4 is a cross-sectional view of the connector 21 which is assembled from the frame 210, the ferrule 211, a coil spring 213, and the stop ring 214.

Assembled as the connector 21, the coil spring 213 is in contact with the ferrule hold 212 at one end, and in contact with the protrusion 215 at the other end. The IC chip 23 is mounted in the stop ring 214. The IC chip 23 has an antenna input terminal connected to the ferrule hold 212 at one end through wiring 216 and connected to the protrusion 215 at the other end. A member 217 of the stop ring 214 is made of a nonconductive material. With this configuration, the coil spring 213 and the IC chip 23 are capable of functioning as an RF tag, using the coil spring 213 as an antenna.

With microfabrication technology of recent years, the IC chip 23 for an RF tag of about 0.1 mm square can be made. However, the IC chip 23 is driven by electric power generated by a radio wave received through an antenna, and therefore, it has been difficult to reduce the size of the antenna for the RF tag. For this reason, it has sometimes been difficult to reduce the size of the RF tag as a whole. However, according to this embodiment, the coil spring 213 in the fiber-optic cable 20 is used as the antenna, which eliminates the need to additionally provide another antenna which is difficult to reduce in size. Therefore, it is not necessary to make a radical change in shape and size of the fiber-optic cable 20 in order to provide the fiber-optic cable 20 with the function of an RF tag.

It should be noted that the member functioning as an antenna of the IC chip 23 may not necessarily be the coil spring 213, as long as the member has a function of urging the ferrule 211, and may be a plate spring or the like. Alternatively, a component in a loop shape (such as a washer or other member used for the purpose of decoration) made of a conductive material and provided to the surface or inside of the fiber-optic cable 20 may also be used as an antenna of the IC chip 23.

Figure 5:
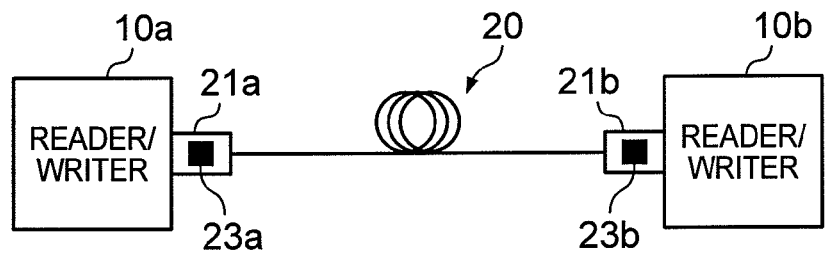
FIG. 5 is a diagram illustrating a system configuration of a cable system in which the reader/writer is used.

FIG. 5 illustrates a system configuration of a cable system 30 in which the reader/writer 10 is used. In the cable system 30, the connector 21, to which an RF tag having the IC chip 23 is mounted, is provided to each of both ends of the fiber-optic cable 20. Then, a reader/writer 10a is connected to a connector 21a provided to one end of the fiber-optic cable 20, and a reader/writer 10b is connected to a connector 21b provided to the other end of the fiber-optic cable 20.

According to the cable system 30, the reader/writer 10a is capable of reading data stored in the IC chip 23a of the connector 21a, and is also capable of reading data stored in the IC chip 23b of the connector 21b by giving an instruction to the reader/writer 10b through the fiber-optic cable 20.

When writing data, the reader/writer 10a is capable of writing data into the IC chip 23a of the connector 21a, and is also capable of writing data into the IC chip 23b of the connector 21b by giving an instruction to the reader/writer 10b through the fiber-optic cable 20.

According to the cable system 30, it is possible to conduct work at a location where one end of the cable is laid, without moving to the place where the other end of the cable is laid. Therefore, the system is effective when both ends of the fiber-optic cable 20 are laid at a considerable distance away from each other.

In the above, an explanation has been given on the first embodiment of the present invention.

As apparent from the explanation described above, according to the reader/writer 10 of the present invention, it is possible to speedily recognize the correspondence between one end and the other end of a fiber-optic cable 20 when a plurality of fiber-optic cables 20 is laid. Further, it is possible to write necessary data into the IC chip 23 from one end of the fiber-optic cable 20 through the fiber-optic cable 20 even when the IC chip 23 is provided to the other end of the fiber-optic cable 20, without moving all the way to the place where the other end of the fiber-optic cable 20 is laid. The present invention is particularly effective when both ends of the fiber-optic cable 20 are laid at a considerable distance away from each other.

It should be noted that the present invention is not limited to the embodiments described above, and various modifications can be made within the scope of the gist of the invention.

Hereinafter, a second embodiment according to the present invention is explained.

Figure 6:
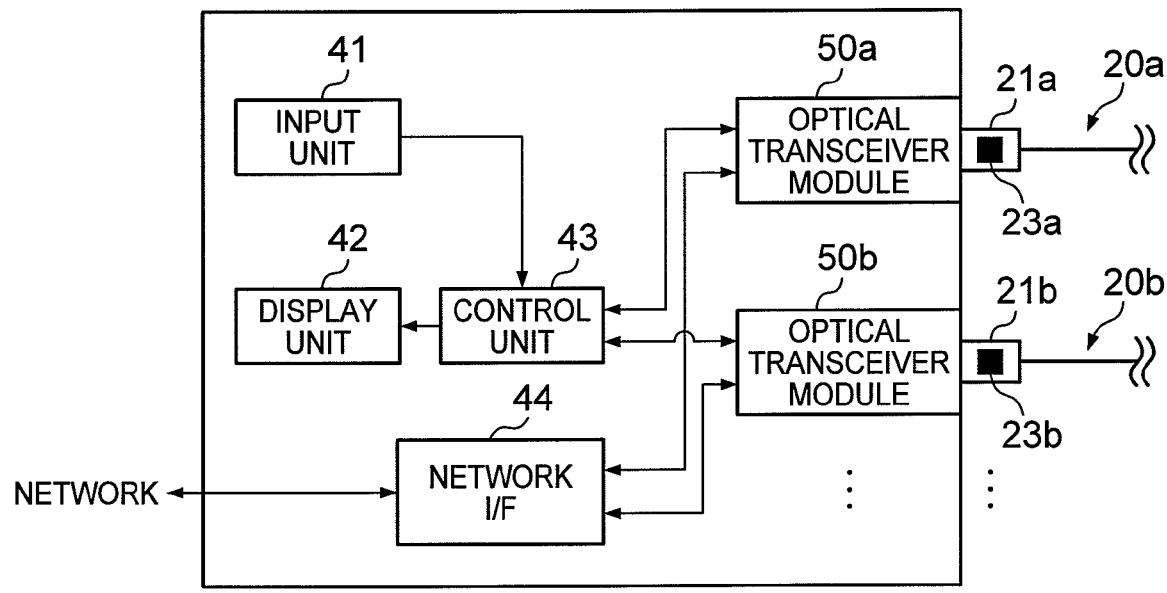
FIG. 6 is a block diagram illustrating a configuration of an optical transmission device according to a second embodiment of the present invention.

FIG. 6 is a block diagram illustrating a configuration of an optical transmission device 40 according to the second embodiment of the present invention. The optical transmission device 40 includes an input unit 41, a display unit 42, a control unit 43, a network interface 44, a plurality of optical transceiver modules 50. The fiber-optic cable 20 according to this embodiment has a configuration similar to that of the first embodiment, and therefore an explanation thereof is omitted.

Each of the optical transceiver modules 50 converts an optical signal received through the fiber-optic cable 20 into an electric signal and sends the electric signal to the network interface 44. The optical transceiver module 50 also converts an electric signal received from the network interface 44 into an optical signal and transmits the optical signal through the fiber-optic cable 20.

Also, each of the optical transceiver modules 50 executes a process of reading data from the IC chip 23, in response to an instruction from the control unit 43, through radio communication based on the specifications of an RF tag and a process of writing data designated by the control unit 43 into the IC chip 23 through radio communication based on the specifications of an RF tag.

Also, each of the optical transceiver modules 50 executes a process of reading data from the IC chip 23 in response to an instruction received from another optical transmission device 40 through the fiber-optic cable 20 and transmitting the data thus read, through the fiber-optic cable 20, and a process of writing data designated through the fiber-optic cable 20 into the IC chip 23 through radio communication based on the specifications of an RF tag.

The network interface 44 converts data based on an electric signal received from each of the optical transceiver modules 50 into a data form that can be used in an external network, and transmits the data to the external network. The network interface 44 also converts a data form received from the external network and sends the data to one of the optical transceiver modules 50 to which the data should be transferred.

The input unit 41 is, for example, a keyboard, which accepts an operational input from a user and supplies the input to the control unit 43. The display unit 42 is, for example, an LCD, which displays data outputted from the control unit 43. The control unit 43 causes each of the optical transceiver modules 50 to operate in a normal mode or maintenance mode, in accordance with an instruction given by a user through the input unit 41.

Specifically, the normal mode in this case refers to a mode in which user data to be transmitted and received through a user terminal or a server connected to a network is transmitted and received at a transmission speed of, for example, about several-Gbps (Giga bits per second), through each of the fiber-optic cables 20. The maintenance mode refers to a mode in which data is read from or written into the IC chip 23 mounted to the fiber-optic cable 20.

In the maintenance mode, data transmitted and received through the fiber-optic cable 20 includes data indicating a read instruction, data read from the IC chip 23 in accordance with the read instruction, data indicating a write instruction, and data to be written in accordance with the write instruction. The memory of the IC chip 23 has a capacity of several hundred bytes, and therefore the transmission band does not need to be so high. Accordingly, data transmission speed at which data is transmitted and received in the maintenance mode is, for example, about several-Kbps, which is much lower than that in the normal mode.

Figure 7:
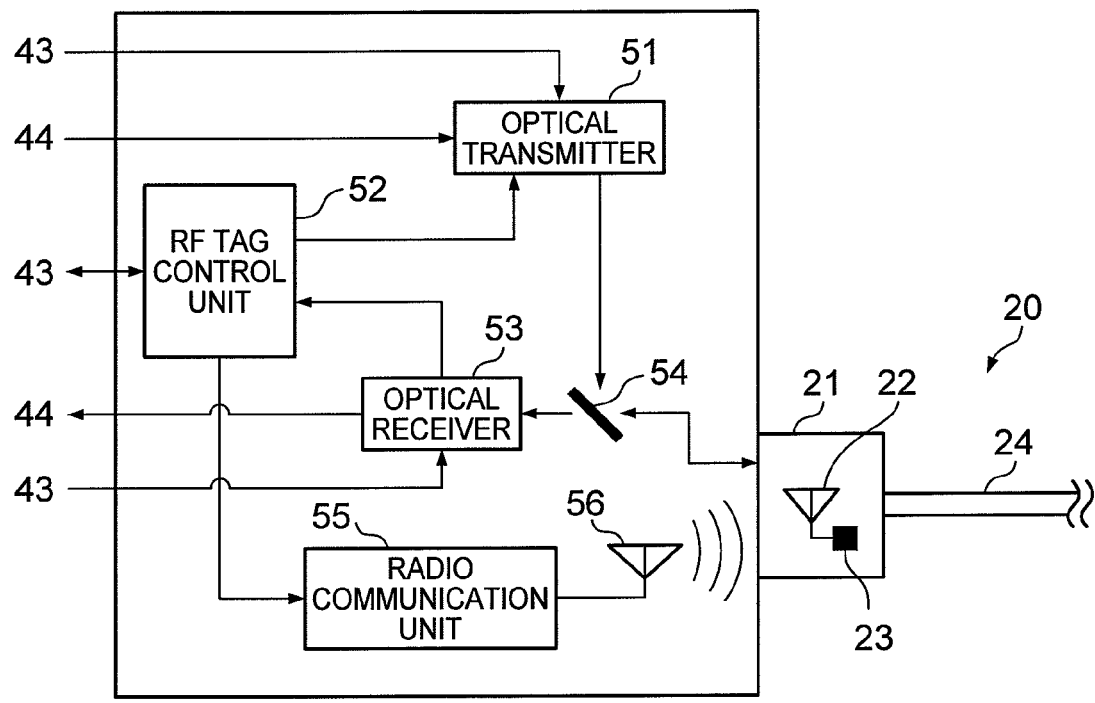
FIG. 7 is a block diagram illustrating a detailed configuration of an optical transceiver module.

FIG. 7 is a block diagram illustrating a detailed configuration of the optical transceiver module 50. The optical transceiver module 50 includes an optical transmitter 51, an RF tag control unit 52, an optical receiver 53, an optical splitter 54, a radio communication unit 55, and an antenna 56.

The optical splitter 54 is, for example, a translucent mirror, which sends an optical signal received through the fiber-optic cable 20, to the optical receiver 53. The optical splitter 54 also sends an optical signal transmitted from the optical transmitter 51, to the fiber-optic cable 20. The optical receiver 53 converts the optical signal received through the optical splitter 54 into an electric signal and supplies the converted signal to the network interface 44 or to the RF tag control unit 52, in accordance with an instruction from the control unit 43. The optical transmitter 51 converts the electric signal received from the network interface 44 or from the RF tag control unit 52 into an optical signal, and transmits the optical signal obtained by the conversion to the fiber-optic cable 20 through the optical splitter 54.

The radio communication unit 55 communicates, in response to an instruction from the RF tag control unit 52, with the IC chip 23 by radio in compliance with the specification of the RF tag, through the antenna 56, to thereby execute a process of reading data stored in the memory of the IC chip 23 and providing the data to the RF tag control unit 52, and a process of writing data received from the RF tag control unit 52 into the memory of the IC chip 23.

When receiving an instruction from the control unit 43 to read data from the RF tag, the RF tag control unit 52 instructs the radio communication unit 55 to read data stored in the memory of the IC chip 23. Then, the RF tag control unit 52 sends the data received from the radio communication unit 55 in response to the read instruction, to the control unit 44. When receiving an instruction from the control unit 44 to write data into the RF tag and receiving the write data, the RF tag control unit 52 sends the data write instruction and the write data to the radio communication unit 55.

Further, when receiving an instruction through the optical receiver 53 to read data from the RF tag, the RF tag control unit 52 instructs the radio communication unit 55 to read data stored in the memory of the IC chip 23. Then, the RF tag control unit 52 sends the data received from the radio communication unit 55 in response to the data read instruction, to the optical receiver 51. When receiving a signal instructing data write and a signal indicating the write data through the optical receiver 53, the RF tag control unit 52 sends the data write instruction and the write data to the radio communication unit 55.

Figure 8:
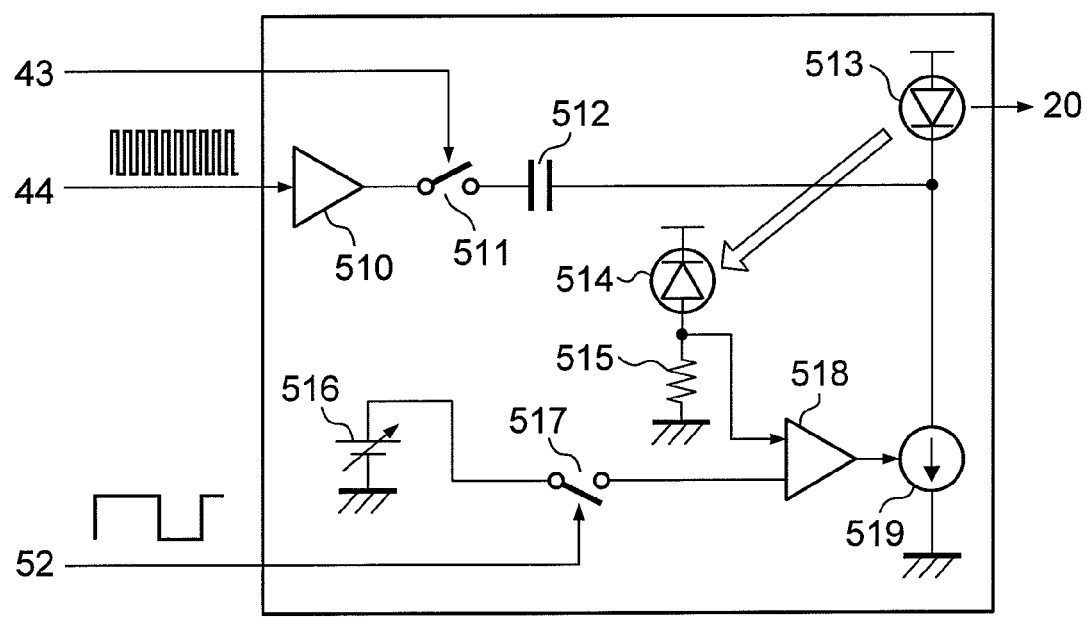
FIG. 8 is a block diagram illustrating a detailed configuration of an optical transmitter.

FIG. 8 is a block diagram illustrating a detailed configuration of the optical transmitter 51. The optical transmitter 51 includes a light-emitting device driving circuit 510, a switch 511, a capacitor 512, a light-emitting device 513, a light-receiving device 514, a resistor 515, a reference voltage source 516, a switch 517, a comparison amplifier 518, and a control current source 519.

The light-emitting device driving circuit 510 has an input terminal connected to the network interface 44 and has an output terminal connected to one end of the capacitor 512 through the switch 511. The other end of the capacitor 512 is connected to a cathode of the light-emitting device 513. The light-emitting device 513 is, for example, an LED, which has an anode connected to a power source and a cathode connected to a ground through the control current source 519.

The reference voltage source 516 has a negative terminal connected to a ground and has a positive terminal connected to a switch 517. The light-receiving device 514 is, for example, a photodiode, which has a cathode connected to a power source and has an anode connected to a ground through the resistor 515. The light-receiving device 514 is disposed in the vicinity of the light-emitting device 513 so that the light-receiving device 514 can receive light generated by the light-emitting device 513. The comparison amplifier 518 has one of the input terminals connected to the switch 517 and has the other one of the input terminals connected to the anode of the light-receiving device 514. An output terminal of the comparison amplifier 518 is connected to an input terminal for current regulation of the control current source 519.

The switch 511 is controlled by the control unit 43 so as to be ON in the normal mode and to be OFF in the maintenance mode. The switch 517 is controlled to be ON in the normal mode. The switch 517 is controlled by the RF tag control unit 52 so as to be ON or OFF in the maintenance mode.

In the normal mode, the light-emitting device driving circuit 510 amplifies an electric signal received from the network interface 44 to supply the amplified electric signal to the cathode of the light-emitting device 513 through the switch 511 and the capacitor 512, and controls the amount of light to be emitted from the light-emitting device 513 in accordance with the electric signal received from the network interface 44, to thereby convert the electric signal received from the network interface 44 into an optical signal and send the optical signal to the fiber-optic cable 20.

The comparison amplifier 518 controls the control current source 519 based on the result of comparison between the voltage of the reference voltage source 516 and the voltage generated at the anode of the light-receiving device 514 due to the light emitted from the light-emitting device 513, to thereby control a bias current of the light-emitting device 513 so that a constant amount of light can be emitted from the light-emitting device 513.

In the maintenance mode, the RF tag control unit 52 turns the switch 157 ON and OFF according to an electric signal which indicating a control of a read instruction, a write instruction, or a write data, to thereby control the amount of light to be emitted from the light-emitting device 513 according to the electric signal indicating the above-mentioned control. The light-emitting device 513 is controlled in amount of light so as to convert the electric signal received from the RF tag control unit 52 into an optical signal and send the optical signal to the fiber-optic cable 20.

In this case, if the control signal sent from the RF tag control unit 52 is converted into an optical signal through the network interface 44, the electric signal indicating the control signal may be attenuated at the capacitor 512 because the control signal is transmitted at a low transmission speed. However, according to the optical transmitter 51 of this embodiment, the electric signal from the RF tag control unit 52 is converted into an optical signal through a route different from the route through which data supplied from the network interface 44 is converted, thereby making it possible to reliably convert the control signal from the RF tag control unit 52 into an optical signal and send the optical signal to the fiber-optic cable 20.

Figure 9:
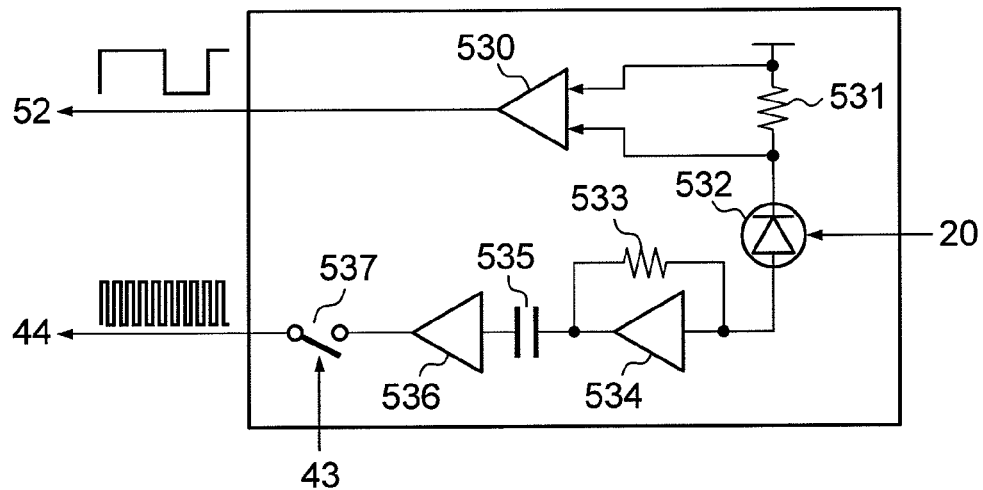
FIG. 9 is a block diagram illustrating a detailed configuration of an optical receiver.

FIG. 9 is a block diagram illustrating a detailed configuration of the optical receiver 53. The optical receiver 53 includes a differential amplifier 530, a resistor 531, a light-receiving device 532, a resistor 533, an amplifier 534, a capacitor 535, an amplifier 536, and a switch 537.

The light-receiving device 532 is, for example, a photodiode, which has a cathode connected to a power source through the resistor 531 and has an anode connected to an input terminal of the amplifier 534. The differential amplifier 530 has two input terminals, one of which is connected to one end of the resistor 531 and the other one of which is connected to the other end of the resistor 531. An output terminal of the differential amplifier 530 is connected to the RF tag control unit 52.

The resistor 533 is connected to an input terminal of the amplifier 534 at one end thereof, and is connected to an output terminal of the amplifier 534 at the other end thereof. The resistor 533 and the amplifier 534 function as a transimpedance amplifier which converts a current into a voltage. The input terminal of the amplifier 534 is connected to an input terminal of the amplifier 536 through the capacitor 535. The output terminal is connected to the network interface 44 through the switch 537.

In the normal mode, the switch 537 is controlled so as to be ON by the control unit 43 so that a current according to an optical signal received by the light-receiving device 532 through the fiber-optic cable 20 is converted into a voltage and outputted to the network interface 44 through the amplifier 534, the capacitor 535, the amplifier 536, and the switch 537.

In the maintenance mode, the switch 537 is controlled so as to be OFF by the control unit 43 so that a voltage generated at the resistor 531 due to a current according to an optical signal received by the light-receiving device 532 through the fiber-optic cable 20 is amplified by the differential amplifier 530 and outputted to the RF tag control unit 52.

It should be noted that the switch 537 may not be provided in the optical receiver 53 as long as the signal level is sufficiently attenuated by the capacitor 535 because of the low transmission speed of the control signal received in the maintenance mode. It is also possible to provide a low pass filter in place of the differential amplifier 530 and the resistor 531 in the optical receiver 53 so as to filter out the high-frequency component generated by the amplifier 534, to thereby extract the control signal and output the extracted signal to the RF tag control unit 52.

Figure 10:
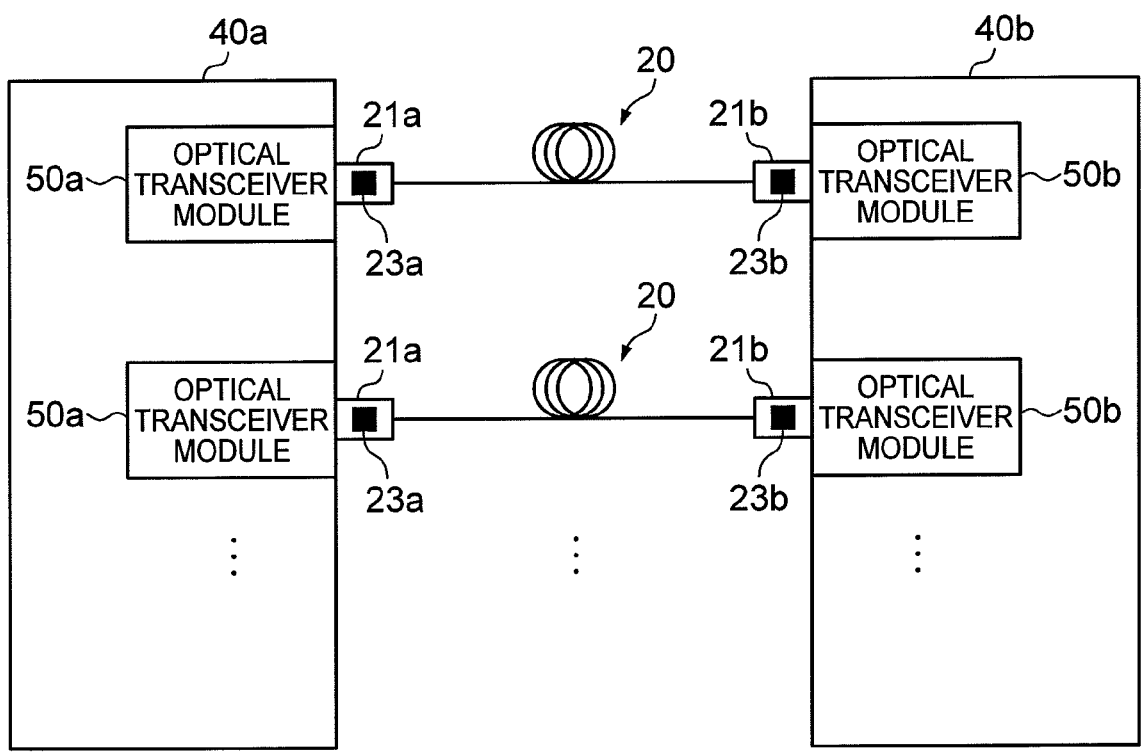
FIG. 10 is a diagram illustrating a system configuration of a cable system in which the optical transmission device is used.

FIG. 10 illustrates a system configuration of a cable system 60 in which the optical transmission device 40 is used. In the cable system 60, a connector 21 is provided to each end of a plurality of fiber-optic cables 20. The connector 21 includes an RF tag having the IC chip 23 mounted thereon. Each of the fiber-optic cables 20 is connected at one end to an optical transceiver module 50a in an optical transmission device 40a, and is connected at the other end to an optical transceiver module 50b in an optical transmission device 40b.

According to the cable system 60 of this embodiment, all the optical transmission devices 40 operate at the maintenance mode on initial start-up, and one of the optical transmission devices 40 which has received an instruction from an administrator controls, as a master, other optical transmission devices 40 through the fiber-optic cable 20. Then, upon receiving an instruction from the optical transmission device 40 operating as a master, each of the other optical transmission devices 40 starts operating in the normal mode.

According to the cable system 60, the optical transmission device 40a is capable of reading data stored in the IC chip 23a of the connector 21a of the fiber-optic cable 20 through each of the optical transceiver modules 50a, and is also capable of reading data stored in the IC chip 23b of the connector 21b by giving an instruction to the optical transceiver module 50b through the fiber-optic cable 20.

When writing data, the optical transmission device 40a is capable of writing data into the IC chip 23a of the connector 21a of the fiber-optic cable 20 through each of the optical transceiver modules 50a, and is also capable of writing data into the IC chip 23b of the connector 21b by giving an instruction to the optical transceiver module 50b through the fiber-optic cable 20.

Meanwhile, there may be a case where a single-mode fiber is mistakenly connected to the optical transceiver module 50 dedicated to a multi-mode fiber and a desired transmission characteristics cannot be attained due to the mismatch of the fiber characteristics in terms of core diameter or the like of the fiber-optic cables. In view of this, according to the cable system 60 of this embodiment, it is possible to check whether an appropriate fiber-optic cable 20 is connected or not by reading in advance data stored in the IC chip 23a in the connector 21a of the fiber-optic cable 20.

Also, if a fiber-optic cable connected to an optical transmission device needs to be taken out in order to obtain information relating to the cable, there is a fear that the end surface of the fiber-optic cable may catch dust or that an engaging unit of the fiber-optic cable may deteriorate. In order to deal with this, according to the cable system 60 of this embodiment, it is possible to quickly obtain information regarding the fiber-optic cable without taking off the fiber-optic cable 20 from the optical transmission device 40, to thereby maintain high reliability in signal transmission using the fiber-optic cable 20.

It should be noted that, in FIG. 10, the fiber-optic cable 20 is connected at one end to the optical transmission device 40 while connected at the other end to the reader/writer 10 described in the first embodiment.

In the above, an explanation has been given on the second embodiment of the present invention. Next, a third embodiment is explained.

Figure 11:
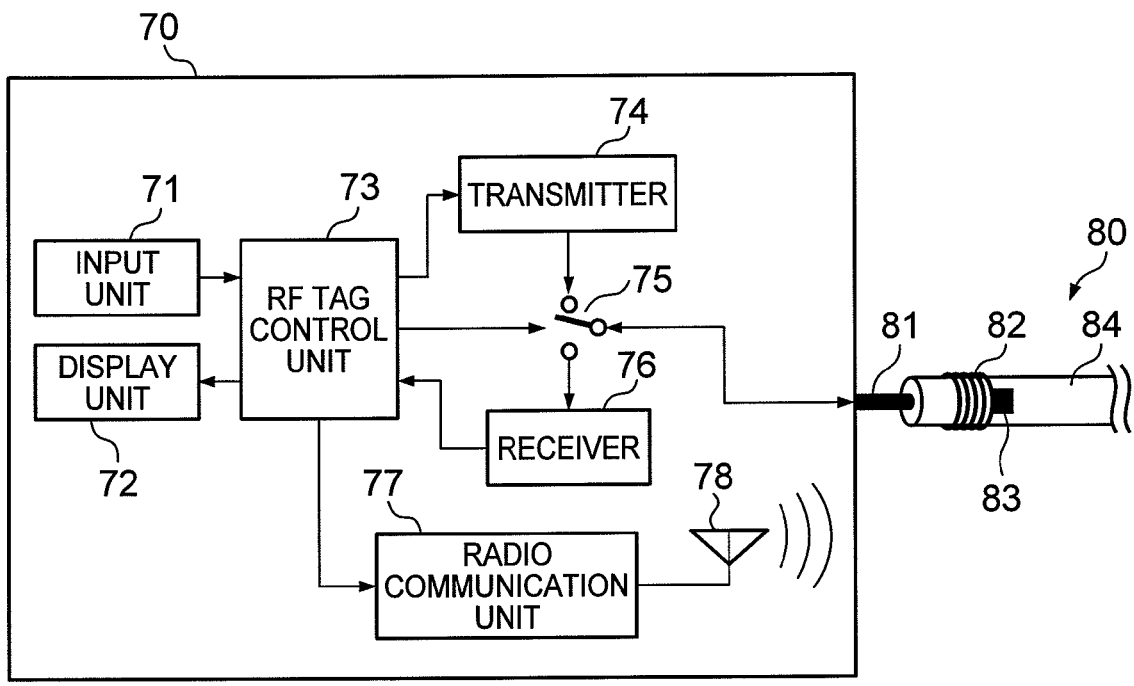
FIG. 11 is a block diagram illustrating a configuration of a reader/writer according to a third embodiment of the present invention.

FIG. 11 is a block diagram illustrating a configuration of a reader/writer 70 according to the third embodiment of the present invention. The reader-writer 70 includes an input unit 71, a display unit 72, an RF tag control unit 73, a transmitter 74, a switch 75, a receiver 76, a radio communication unit 77, and an antenna 78. The reader/writer 70 is used while being connected to a cable 80 which transmits an electric signal.

The cable 80 is formed by covering core wire 81 made of a conductive material such as metal with coating 84 made of a nonconductive material such as vinyl. An antenna 82 and an IC chip 83 are provided to each end of the cable 80. The RF tag control unit 73 is driven by electric power generated by a radio wave received through the display unit 72. The RF tag control unit 73 has a function of performing radio communication through the display unit 72 in compliance with the specifications of an RF tag (for example, ISO/IEC 18000-3) and a memory or the like which stores data externally obtained through radio communication. The display unit 72 and the RF tag control unit 73 constitute an RF tag.

In this embodiment, the cable 80 is assumed to be a cable such as a power line, a telephone line, or a speaker cable, which transmits an electric signal. The cable 80 includes a cable used for a purpose (of electric power distribution) other than for data transmission.

The input unit 71 is, for example, a keyboard, which accepts an operational input from a user and supplies the input to the RF tag control unit 73. The display unit 72 is, for example, an LCD, which displays data outputted from the RF tag control unit 73. Alternatively, as another example, the input unit 71 and the display unit 72 each may function as an interface of an input device such as a keyboard, and a display device such as an LCD, respectively, the input device and the display device being provided outside of the reader/writer 70.

In response to an instruction from the RF tag control unit 73, the switch 75 sends an electric signal received through the cable 80 to the receiver 76, and also sends an electric signal transmitted from the transmitter 74, to the cable 80. The transmitter 74 converts data received from the RF tag control unit 73 into an electric signal form to be transmitted to the cable 80, and transmits the converted data to the cable 80 through the switch 75. The receiver 76 converts the signal form of data received from the cable 80 through the switch 75, and sends the data to the RF tag control unit 73.

Alternatively, according to another embodiment, the output terminal of the transmitter 74 may be formed as an open collector or an open drain, and a pull-up resistor may be provided between the output terminal of the transmitter 74 and the input terminal of the receiver 76, so that the reader/writer 70 is able to transmit an electric signal outputted from the transmitter 74, to the cable 80, and input an electric signal received through the cable 80 to the receiver 76, without using the switch 75.

The radio communication unit 77 communicates, in response to an instruction from the RF tag control unit 73, with the IC chip 83 by radio in compliance with the specification of the RF tag, through the antenna 78, to thereby execute a process of reading data stored in the memory of the IC chip 83 and providing the data to the RF tag control unit 73, and a process of writing data received from the RF tag control unit 73 into the memory of the IC chip 83.

When receiving an instruction from a user through the input unit 71 to read data from the RF tag, the RF tag control unit 73 instructs the radio communication unit 77 to read data stored in the memory of the IC chip 83. Then, the RF tag control unit 73 displays the data received from the radio communication unit 77 in response to the data read instruction, on the display unit 72. On receiving an instruction from a user through the input unit 71 to write data into the RF tag and on receiving the write data, the RF tag control unit 73 sends the write instruction and the write data to the radio communication unit 77.

Further, when receiving an instruction through the receiver 76 to read data from the RF tag, the RF tag control unit 73 instructs the radio communication unit 77 to read data stored in the memory of the IC chip 83. Then, the RF tag control unit 73 sends the data received from the radio communication unit 77 in response to the data read instruction, to the transmitter 74. When receiving a signal instructing data write and a signal indicating the write data through the receiver 76, the RF tag control unit 73 sends the data write instruction and the write data to the radio communication unit 77.

Even in the case of a cable which is not used for the purpose of data transmission, according to the reader/writer 70 of this embodiment, it is possible to obtain information on one end of the cable at a location where the other end of the cable is laid. Therefore, it is possible to speedily and reliably perform connection work in a case of handling a power line which is laid over a long distance or in a case of handling a large number of speaker cables in a concert hall or the like.

It is preferable that the antenna 82 of the cable 80 be mounted in such a manner that the antenna 82 is wound around the circumference of the coating 84. Also, in this case, it is preferable that the antenna 78 of the reader/writer 70 be provided in the reader/writer 70 in such a manner that the antenna 78 opposes the antenna 82 in a state where the cable 80 is connected to the reader/writer 70, so that the antenna 78 and the antenna 82 can transmit and receive electric waves with efficiency.

Figure 12:
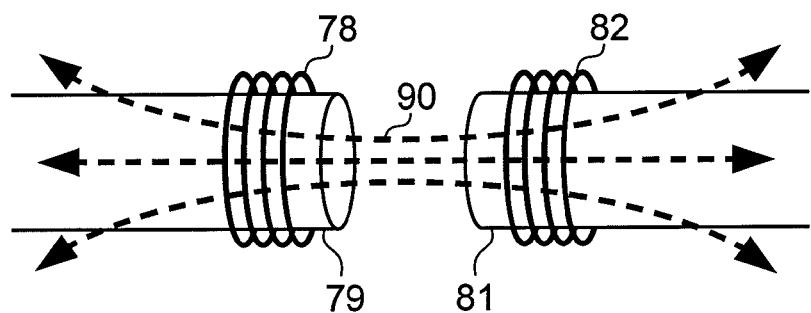
FIG. 12 is a schematic diagram illustrating a preferred positional relation between an antenna (78) and an antenna (82).

Further, according to this embodiment, the core wire 81 of the cable 80 is made of, for example, iron, which has conductivity with relatively high relative magnetic permeability. In the reader/writer 70, a member 79 connected to the core wire 81 is also made of, for example, iron, which has conductivity with relatively high relative magnetic permeability. Accordingly, it is preferable that the antenna 78 be in a loop shape and disposed around the member 79. In this way, as shown in FIG. 12, it is possible to cause many magnetic lines 90 to be interlinked across the antenna 78 and the antenna 82, with the result that the antenna 78 and the antenna 82 can transmit and receive electric waves with higher efficiency.

Also, according to this embodiment, the antenna 82 is directly wound around the coating 84. However, according to another embodiment, connectors may be provided to both ends of the cable 80, and each of the connectors may accommodate the antenna 82 and the IC chip 83.

In the above, the embodiments of the present invention have been described. However, the technical scope of the present invention is not limited to that described in relation to the above embodiments. Also, it is apparent to those skilled in the art that various modifications and improvements can be made to the above embodiments. Further, it is clear from the description in the scope of the claims that embodiments to which those modifications and improvements have been made are also included in the technical scope of the present invention.

What is claimed is:

1. A reader/writer, which writes data into an RF tag mounted to an end of a fiber-optic cable and reads data from the RF tag, through radio communication, the reader/writer comprising:

an optical receiver which converts an optical signal received through the fiber-optic cable into an electric signal;

an optical transmitter which converts an electric signal into an optical signal and transmits the optical signal to the fiber-optic cable;

a radio communication unit which performs radio communication with the RF tag; and an RF tag control unit which reads, on receiving through the optical receiver a signal that is an instruction to read data, data from the RF tag through the radio communication unit and transmits the read data to the fiber-optic cable through the optical transmitter, and writes, on receiving through the optical receiver a signal that is an instruction to write data and a signal indicating the write data, the write data thus received into the RF tag through the radio communication unit.

2. A reader/writer according to claim 1, further comprising:

an input unit which receives an input from a user and supplies the input to the RF tag control unit; and a display unit which displays data received from the RF tag control unit; wherein:

the reader/writer is connected to an end of the fiber-optic cable which is provided with an RF tag at both ends thereof; and the RF tag control unit transmits, on receiving an instruction through the input unit to read data stored in an RF tag mounted to the other end of the fiber-optic cable, a signal, that is the read instruction, to the fiber-optic cable through the optical transmitter, and instructs, on receiving in response to the signal that is the read instruction, a signal indicating the data stored in the RF tag mounted to the other end of the fiber-optic cable, the display unit to display information indicating the data thus received.

3. A cable system, comprising:

a fiber-optic cable which has an RF tag mounted on both ends thereof; and the reader/writer according to claim 2, which is connected to both ends of the fiber-optic cable.

4. A cable system according to claim 3, wherein:

the fiber-optic cable includes connectors at both ends thereof; and each connector includes:
  a ferrule;
  an urging unit which is made of a conductive material and urges the ferrule against the reader/writer when the connector is connected to the reader/writer; and
  an IC chip which is connected to the urging unit and constitutes an RF tag together with the urging unit, the urging unit being used as an antenna.

5. A cable system, comprising:

a fiber-optic cable which has an RF tag mounted on both ends thereof; and the optical transceiver module according to claim 3, which is connected to both ends of the fiber-optic cable.

6. A cable system according to claim 5, wherein:

the fiber-optic cable includes connectors at both the ends thereof; and each connector includes:
  a ferrule;
  an urging unit which is made of a conductive material and urges the ferrule against the optical transceiver module when the connector is connected to the optical transceiver module; and
  an IC chip which is connected to the urging unit and constitutes an RF tag together with the urging unit, the urging unit being used as an antenna.

7. An optical transceiver module, comprising:

an optical receiver which converts an optical signal received through a fiber-optic cable into an electric signal;

an optical transmitter which converts an electric signal into an optical signal and transmits the optical signal to the fiber-optic cable;

a radio communication unit which performs radio communication with an RF tag mounted to an end of the fiber-optic cable; and an RF tag control unit which reads, on receiving through the optical receiver a signal that is an instruction to read data, data from the RF tag through the radio communication unit, and transmits the read data to the fiber-optic cable through the optical transmitter, and writes, on receiving through the optical receiver a signal that is an instruction to write data and a signal indicating the write data, the write data thus received into the RF tag through the radio communication unit.

8. A reader/writer which writes data into an RF tag, the RF tag being mounted to an end of a cable which transmits an electric signal, and reads data from the RF tag, through radio communication, the reader/writer comprising:

a receiver which receives an electric signal received through the cable;

a transmitter which transmits an electric signal to the cable;

a radio communication unit which performs radio communication with the RF tag; and an RF tag control unit which reads, on receiving through the receiver a signal that is an instruction to read data, data from the RF tag through the radio communication unit and transmits the read data to the cable through the transmitter, and writes, on receiving through the receiver a signal that is an instruction to write data and a signal indicating the write data, the write data thus received into the RF tag through the radio communication unit.

9. A reader/writer according to claim 8, further comprising:

an input unit which receives an input from a user and supplies the input to the RF tag control unit; and a display unit which displays data received from the RF tag control unit; wherein:

the reader/writer is connected to an end of the cable which is provided with an RF tag at both ends thereof; and the RF tag control unit transmits, on receiving an instruction through the input unit to read data stored in an RF tag mounted to the other end of the cable, a signal that is the read instruction, to the cable, through the transmitter, and instructs, on receiving, in response to the signal that is the read instruction, a signal indicating the data stored in the RF tag mounted to the other end of the cable, the display unit to display information indicating the data thus received.

10. A cable system, comprising:

a cable which transmits an electric signal, and has an RF tag mounted on both ends thereof; and the reader/writer according to claim 9, which is connected to both ends of the cable.

* * * * *